(12) United States Patent
Saruta et al.

(10) Patent No.: US 8,526,679 B2
(45) Date of Patent: Sep. 3, 2013

(54) IMAGE PROCESSING APPARATUS AND IMAGE PROCESSING METHOD

(75) Inventors: Takayuki Saruta, Tokyo (JP); Masato Aoba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 216 days.

(21) Appl. No.: 12/910,296

(22) Filed: Oct. 22, 2010

(65) Prior Publication Data

US 2011/0103652 A1 May 5, 2011

(30) Foreign Application Priority Data

Oct. 30, 2009 (JP) ................................. 2009-251356

(51) Int. Cl.
*G06K 9/00* (2006.01)
*G06K 9/66* (2006.01)

(52) U.S. Cl.
USPC ........................................ 382/106; 382/195

(58) Field of Classification Search
None
See application file for complete search history.

(56) References Cited

U.S. PATENT DOCUMENTS 5,901,244 A 5/1999 Souma et al. ................. 382/190

FOREIGN PATENT DOCUMENTS

| JP | 05-288531 | 11/1993 |
|---|---|---|
| JP | 2000-285198 | 10/2000 |
| JP | 3154501 | 4/2001 |
| JP | 2003-345830 | 12/2003 |
| JP | 3841481 | 11/2006 |
| JP | 3945971 | 7/2007 |

OTHER PUBLICATIONS

Lowe, D.G.; , "Local feature view clustering for 3D object recognition," Computer Vision and Pattern Recognition, 2001. CVPR 2001. Proceedings of the 2001 IEEE Computer Society Conference on , vol. 1, No., pp. I-682-I-688 vol. 1, 2001 doi: 10.1109/CVPR.2001. 990541 URL: http://ieeexplore.ieee.org/stamp/stamp.jsp?tp= &arnumber=990541&isnumber=21353.*
Noburu Nishikawa, et al., "Object Recognition Based on Camera Control", T.IEE Japan, vol. 118-C, No. 2, 1998.
H. Borotsching, "Appearance-based active object recognition", Image and Vision Computing 18 (2000), pp. 715-727.
H. Bay, "Speeded-Up Robust Features (SURF)", Computing Vision and Image Understanding, vol. 110,(3), Jun. 2008, pp. 346-359.
E. Tola, "A Fast Local Descriptor for Dense Matching", CVPR 2008.
K. Mikolajczyk, "A Performance Evaluation of Local Descriptors"< PAMI 27 (10) 2004, pp. 1615-1630.
Mitsuru Jindai et al., "A Recognition Method Combining CAD Information with Image Processing Using a Movable Camera," Japan Society of Mechanical Engineers, No. 99-0184, Oct. 2000, pp. 172-181.

* cited by examiner

*Primary Examiner* — Stephen R Koziol
*Assistant Examiner* — Amandeep Saini
(74) *Attorney, Agent, or Firm* — Fitzpatrick, Cella, Harper & Scinto

(57) ABSTRACT

A feature amount cluster holding unit extracts respective feature amounts from N images sensed under N respective types of image sensing conditions, and manages the feature amounts extracted from each sensed image as a feature amount cluster in association with corresponding one of the image sensing conditions. A feature space distance calculation unit specifies the second feature amount cluster containing a feature amount similar to the feature amount of interest in the first feature amount cluster. An image sensing condition setting unit specifies sets of feature amounts associated with the N respective types of image sensing conditions from the first and second feature amount clusters. The image sensing condition setting unit specifies a set having a largest distance between feature amounts in the set among the specified sets. An image sensing condition associated with the specified set is output as an image sensing condition for discriminating the feature amount clusters.

9 Claims, 11 Drawing Sheets

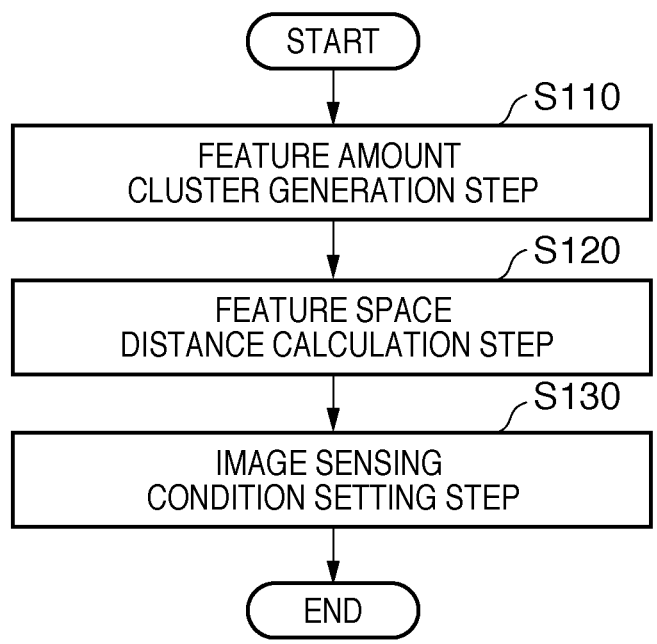
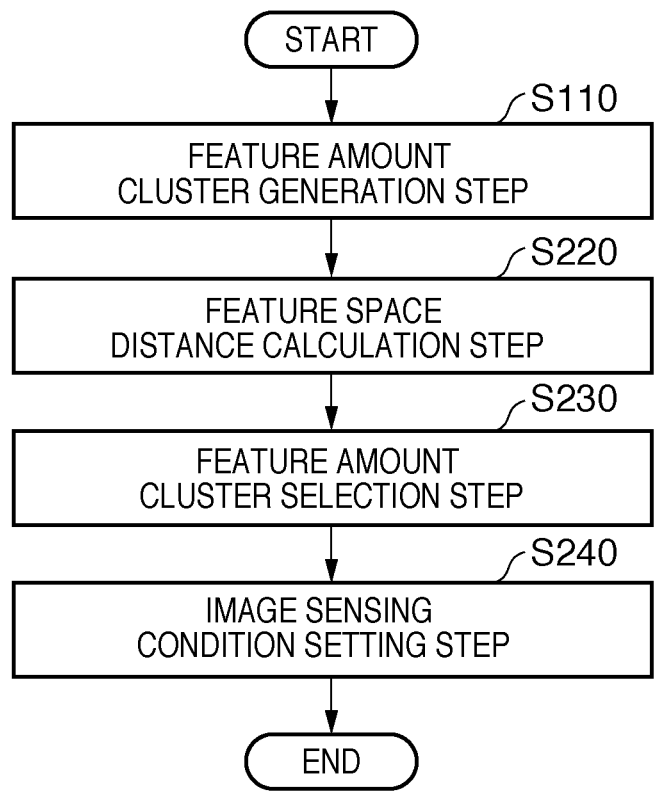

IMAGE PROCESSING APPARATUS AND IMAGE PROCESSING METHOD

BACKGROUND OF THE INVENTION

1. Field of the Invention

The present invention relates to a technique of handling a feature amount in an image.

2. Description of the Related Art

These days, there is a growing demand for a robot which performs work such as assembly in a factory or the like. When the robot handles a work target object whose position and orientation are not always constant, a means for measuring the position and orientation of the work target object is required. As this means, a visual sensor is generally used.

To perform work such as more complicated assembly by a robot, parts to be assembled and the like need to be recognized using a visual sensor. It has long been studied to collate shape information such as CAD data of a part with 2D or 3D information obtained by the visual sensor or the like, and recognize the type, position, and orientation of the part. Also, studies have been extensively made for a recognition method of causing a computer to learn a feature amount extracted from a target object image obtained by an image sensing means, and recognizing the type of object captured in the input image.

At present, various kinds of products are sometimes assembled on the same production line in a factory to cope with a change from the mass production era to the multi-product production era. In each assembly process, similar parts or falsely similar parts need to be assembled. To automate such an assembly process, a recognition method capable of discriminating similar parts or falsely similar parts is necessary.

To meet this demand, studies using active vision have been made. The active vision assumes the vision of robots which discriminate and convey articles in a factory or the like. The active vision can control and change the position and orientation of a visual sensor such as a camera with respect to a target object.

In non-patent reference 1 (Noboru Nishikawa, Masaki Onishi, Takuya Matsumoto, Masao Izumi and Kunio Fukunaga, "Object Recognition Based on Camera Control", T.IEE Japan, Vol. 118-C, No. 2, 1998), the result of recognizing which model object coincides with a recognition target object in an input image is expressed by the degree of recognition-ambiguity given by the sum of basic probabilities at each of which the recognition target object is each model. The degree of recognition-ambiguity is used as the function of the position and orientation of a camera. The camera is moved using a steepest descent method to minimize the degree of recognition-ambiguity.

In non-patent reference 2 (Mitsuru Jindai, Hirokazu Osaki, Satoru Shibata and Akira Shimizu, "A Recognition Method Combining CAD Information with Image Processing Using a Movable Camera", Transactions of the Japan Society of Mechanical Engineers, Vol. 66, No. 650), images in multiple directions are acquired using a movable camera and recognized. In discrimination of similar objects, the difference between two pieces of CAD information is obtained to estimate a different part between them. The position and direction of the camera are determined to easily discriminate the different part. An input image and CAD image are compared at the position in the direction, discriminating similar objects.

In non-patent reference 3 (H. Borotschnig, "Appearance-based active object recognition", Image and Vision Computing 18 (2000), pp. 715-727), an appearance change caused by viewpoint variations and illumination variations of a target object is learned as a manifold in an eigenspace. In recognition, the recognition result is expressed by the probability distribution, and optimized in the manifold, discriminating the object and estimating its position and orientation.

In patent reference 1 (Japanese Patent Laid-Open No. 5-288531), a 3D object is recognized from 2D image data acquired by an image sensing device. At this time, the recognizing result of a neural network is input to a determination unit. When the degree of neuron excitement is smaller than a preset level, the position of the image sensing device is changed. Then, 2D image data of the 3D object is acquired from a different position. The image sensing position change process, recognition process, and determination process are repeated until the degree of neuron excitement becomes larger than the preset level.

In patent reference 2 (Japanese Patent No. 3154501), an object and viewing direction from which sensed object image information is obtained are determined based on a comparison in shape and color between the sensed object image information, and knowledge information of the 3D shape, appearance shape, and object surface color of a known object. If the object shape is discriminated from the determination result, the process ends. If the object shape is not discriminated because of a shortage of image information in determination, an image sensing position for acquiring short image information is obtained. The image sensing device is moved to this position to sense an image, complementing the short image information.

In patent reference 3 (Japanese Patent Laid-Open No. 2000-285198), an image sensing condition suited to the recognition operation of a recognition apparatus is calculated from distance information between a recognition target and an image sensing device that is input from the image sensing device. Based on the calculated condition, the image sensing operation of the image sensing device is controlled. In an embodiment, the angle of view of a camera is calculated from the distance between the license number of a license plate and the lens, the focal length, the license number size, and the license number size on the image sensor so that the size of the license number of the license plate becomes almost equal to that of a license number stored in an image.

Among studies on a recognition technique of extracting a given feature amount from an image, mapping it in a feature space defined by the feature vector, and learning a discriminant function, many studies have been made to discriminate similar target objects or falsely similar target objects from each other.

In patent reference 4 (Japanese Patent No. 3841481), feature vectors close to respective feature vectors are selected in a feature vector space. A subspace vector space which maximizes local interspersion when the selected feature vectors are orthogonally projected is output. By projecting the selected feature vectors in the generated subspace and discriminating them, even indistinguishable data can be discriminated at higher precision than the conventional one.

Patent reference 5 (Japanese Patent N 3945971) discloses the following arrangement for similar category discrimination. More specifically, the variance is obtained by projecting learning data of the category of interest in the axial direction of a subspace in which the weighted average of the covariance matrix of a category similar to the category of interest, and the covariance matrix of the category of interest are mixed. A quadratic discriminant function is obtained using the variance. Based on this function, erroneous recognition of a similar category is prevented.

In patent reference 6 (Japanese Patent Laid-Open No. 2003-345830), the number of images saved in learning is suppressed while maintaining the search (recognition) precision. For this purpose, a range occupied by a search (recognition) target in a feature amount space is obtained using feature amounts extracted from an image containing the search (recognition) target. Then, distances to learned images containing no search (recognition) target in the feature space are calculated. An image whose distance falls within the range of preset values is registered as a similar image. Only the search (recognition) target region (space) and similar image region (space) in the feature space are saved.

In conventional studies on the recognition technique of extracting a given feature amount from an image, mapping it in a feature space defined by the feature amount vector, and learning a discriminant function, it is difficult to discriminate similar target objects or falsely similar target objects from each other at high precision.

When features are extracted from an image which captures similar target objects or falsely similar target objects under a given image sensing condition, and are mapped in the feature space, they are close to each other in the feature space. If the distance between the features is smaller than a measurement error or the like, the features cannot be discriminated from each other. In this case, it is necessary to change the image sensing condition, acquire a target object image again, or perform secondary discrimination or the like.

In non-patent reference 1, the degree of recognition-ambiguity is expressed by the function using the position and orientation of a camera as variables. Optimization is done using a steepest descent method so as to decrease the degree of recognition-ambiguity. However, an optimum image sensing device position is not uniquely determined for a recognition target object. Further, image sensing condition parameters to be changed are limited to the position and orientation of the image sensing device.

In non-patent reference 2, there are many limited conditions when performing recognition using 3D CAD data and a movable camera while changing the viewpoint of the camera. This method is premised on that only one target object is placed in the recognition area and is irradiated with uniform light vertically from above the target object, and the recognition area is painted in black so that the luminance value becomes smaller than that of the target object in processing. This method is basically based on the geometrical information and luminance value of CAD data, and does not use a feature amount obtained from an image. Also, an optimum camera position and orientation are not uniquely determined.

Non-patent reference 3 refers to only estimation of the orientation of a single object, and does not mention discrimination/distinction of similar target objects or falsely similar target objects. This method does not uniquely determine an image sensing condition for distinguishing such target objects.

In patent reference 1, the position of an image sensing device is changed to repeat recognition until the degree of neuron excitement becomes higher than a preset level. An optimum image sensing device position is not uniquely determined for a recognition target object. Further, a position to be changed is not determined by recognition or a learning result. Similar to non-patent reference 1, image sensing condition parameters to be changed are limited to the position and orientation of the image sensing device.

In patent reference 2, as well as patent reference 1, an image sensing condition parameter to be changed is limited to the position of the image sensing device. In an embodiment, the method copes with occlusion of a target object, and does not execute a task of changing the position of the image sensing device in order to discriminate similar target objects or falsely similar target objects.

In patent references 4 and 5, when similar target objects are captured from a given viewpoint, they look the same. If feature amounts or the like extracted from the image are almost equal, it is difficult to discriminate them. In this case, these methods do not execute a task of changing the image sensing condition for acquiring a target object image.

In patent reference 6, the distance is calculated in the feature space, and a similar image region is learned in the feature space in accordance with the distance. However, similar to patent references 4 and 5, this method does not solve a problem that when similar target objects are captured from a given viewpoint, they look the same, and a search (recognition) image and similar image cannot be distinguished in discrimination.

SUMMARY OF THE INVENTION

The present invention has been made to solve the above problems, and provides a technique useful for discriminating similar target objects or falsely similar target objects from each other.

According to the first aspect of the present invention, an image processing apparatus comprising: a unit which acquires N images sensed under N respective types of image sensing conditions; a management unit which extracts respective feature amounts from the N sensed images, and manages the feature amounts extracted from each sensed image as a feature amount cluster in association with corresponding one of the image sensing conditions; a first specification unit which specifies a second feature amount cluster containing a feature amount similar to a feature amount of interest in a first feature amount cluster among feature amount clusters managed by the management unit; a second specification unit which specifies sets of feature amounts associated with the N respective types of image sensing conditions from the first feature amount cluster and the second feature amount cluster; a third specification unit which specifies a set having a largest distance between feature amounts in the set among the sets specified by the second specification unit; and an output unit which outputs an image sensing condition associated with the set specified by the third specification unit, as an image sensing condition for discriminating the first feature amount cluster and the second feature amount cluster.

According to the second aspect of the present invention, an image processing apparatus comprising: a unit which acquires N images sensed under N respective types of image sensing conditions; a management unit which extracts respective feature amounts from the N sensed images, and manages the feature amounts extracted from each sensed image as a feature amount cluster in association with corresponding one of the image sensing conditions; a specification unit which specifies, from the feature amount cluster, a feature amount similar to a feature amount of interest in the feature amount cluster; and an output unit which outputs an image sensing condition for discriminating the feature amount cluster, based on an image sensing condition associated with the feature amount of interest and an image sensing condition associated with the feature amount specified by the specification unit.

According to the third aspect of the present invention, an image processing method comprising: a step of acquiring N images sensed under N respective types of image sensing conditions; management step of extracting respective feature amounts from the N sensed images, and managing the feature amounts extracted from each sensed image as a feature amount cluster in association with corresponding one of the image sensing conditions; a first specification step of specifying a second feature amount cluster containing a feature amount similar to a feature amount of interest in a first feature amount cluster among feature amount clusters managed in the management step; a second specification step of specifying sets of feature amounts associated with the N respective types of image sensing conditions from the first feature amount cluster and the second feature amount cluster; a third specification step of specifying a set having a largest distance between feature amounts in the set among the sets specified in the second specification step; and an output step of outputting an image sensing condition associated with the set specified in the third specification step, as an image sensing condition for discriminating the first feature amount cluster and the second feature amount cluster.

According to the fourth aspect of the present invention, an image processing method comprising: a step of acquiring N images sensed under N respective types of image sensing conditions; a management step of extracting respective feature amounts from the N sensed images, and managing the feature amounts extracted from each sensed image as a feature amount cluster in association with corresponding one of the image sensing conditions; a specification step of specifying, from the feature amount cluster, a feature amount similar to a feature amount of interest in the feature amount cluster; and an output step of outputting an image sensing condition for discriminating the feature amount cluster, based on an image sensing condition associated with the feature amount of interest and an image sensing condition associated with the feature amount specified in the specification step.

Further features of the present invention will become apparent from the following description of exemplary embodiments with reference to the attached drawings.

BRIEF DESCRIPTION OF THE DRAWINGS

FIGS. 2A and 2B are flowcharts each of processing performed by a calculation unit 200;

DESCRIPTION OF THE EMBODIMENTS

Embodiments of the present invention will now be described with reference to the accompanying drawings. It should be noted that the following embodiments are merely examples of specifically practicing the present invention, and are practical examples of the arrangement defined by the scope of the appended claims.

First Embodiment

Figure 1:
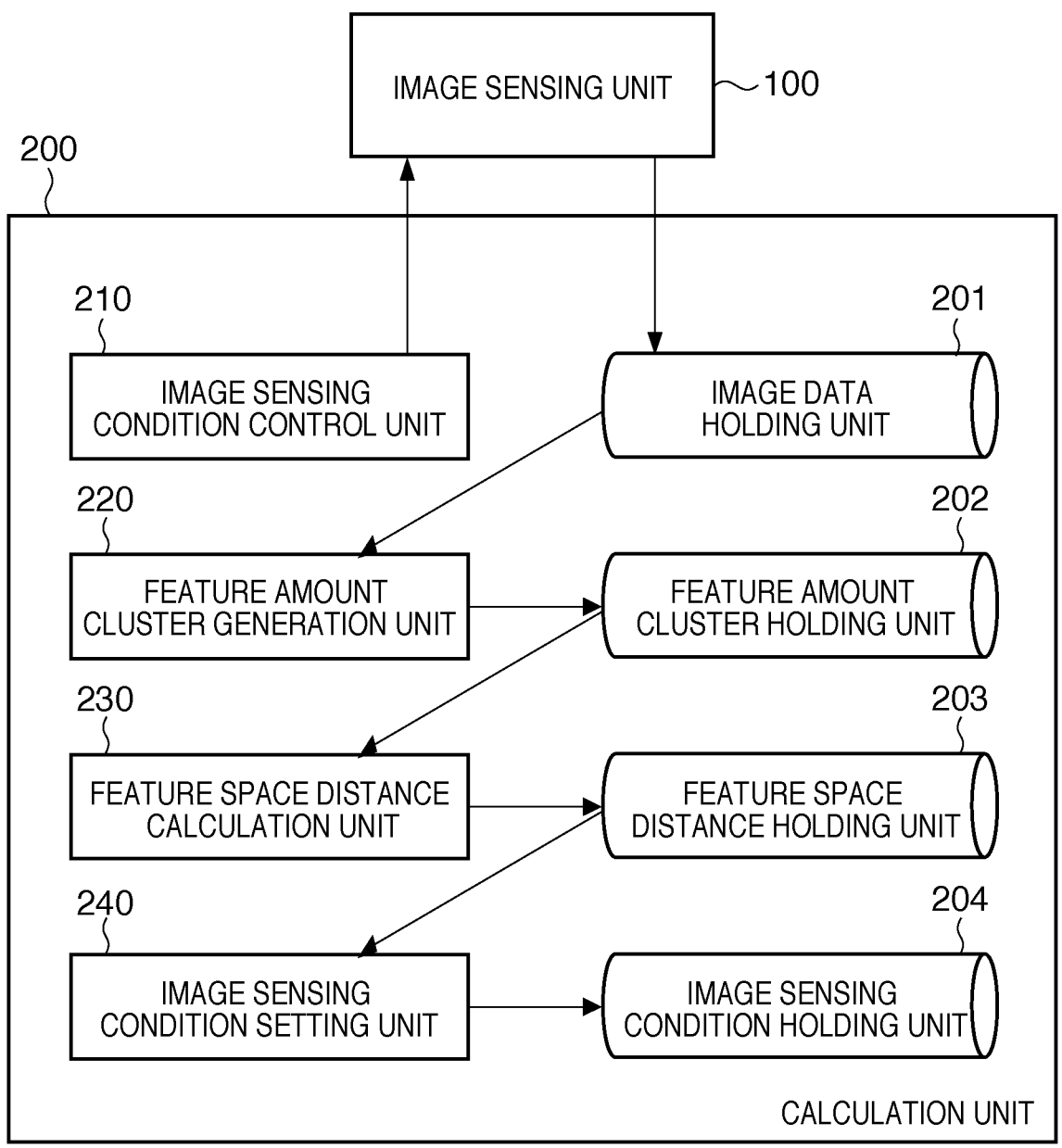
FIG. 1 is a block diagram exemplifying the functional arrangement of an image processing apparatus.

FIG. 1 is a block diagram exemplifying the functional arrangement of an image processing apparatus according to the first embodiment. As shown in FIG. 1, the image processing apparatus according to the first embodiment includes an image sensing unit 100 which senses an image in a physical space under a set image sensing condition, and a calculation unit 200 which performs various calculation processes (to be described later). Further, the calculation unit 200 includes an image sensing condition control unit 210, image data holding unit 201, feature amount cluster generation unit 220, feature amount cluster holding unit 202, feature space distance calculation unit 230, feature space distance holding unit 203, image sensing condition setting unit 240, and image sensing condition holding unit 204.

Figure 3A:
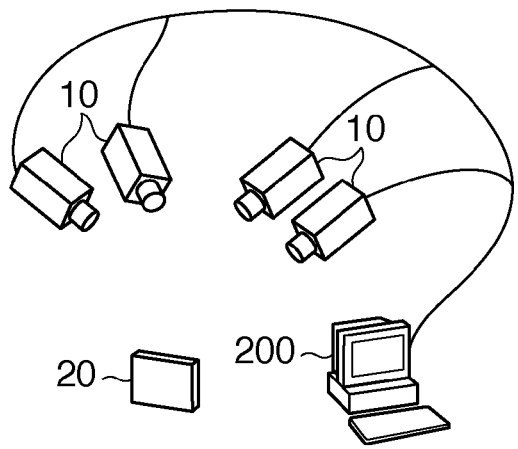
FIGS. 3A and 3B are views exemplifying the outer appearance of the image processing apparatus.

FIG. 3A is a view exemplifying the outer appearance of the image processing apparatus according to the first embodiment. As shown in FIG. 3A, the image sensing unit 100 includes a plurality of cameras 10. Each camera 10 senses one target object 20 under a variety of image sensing conditions. The "image sensing conditions" are an illumination condition for irradiating the target object 20, the resolution of an image to be captured, the angle of view of the camera 10, and a combination of them, in addition to position & orientation information of the camera 10.

Figure 6:
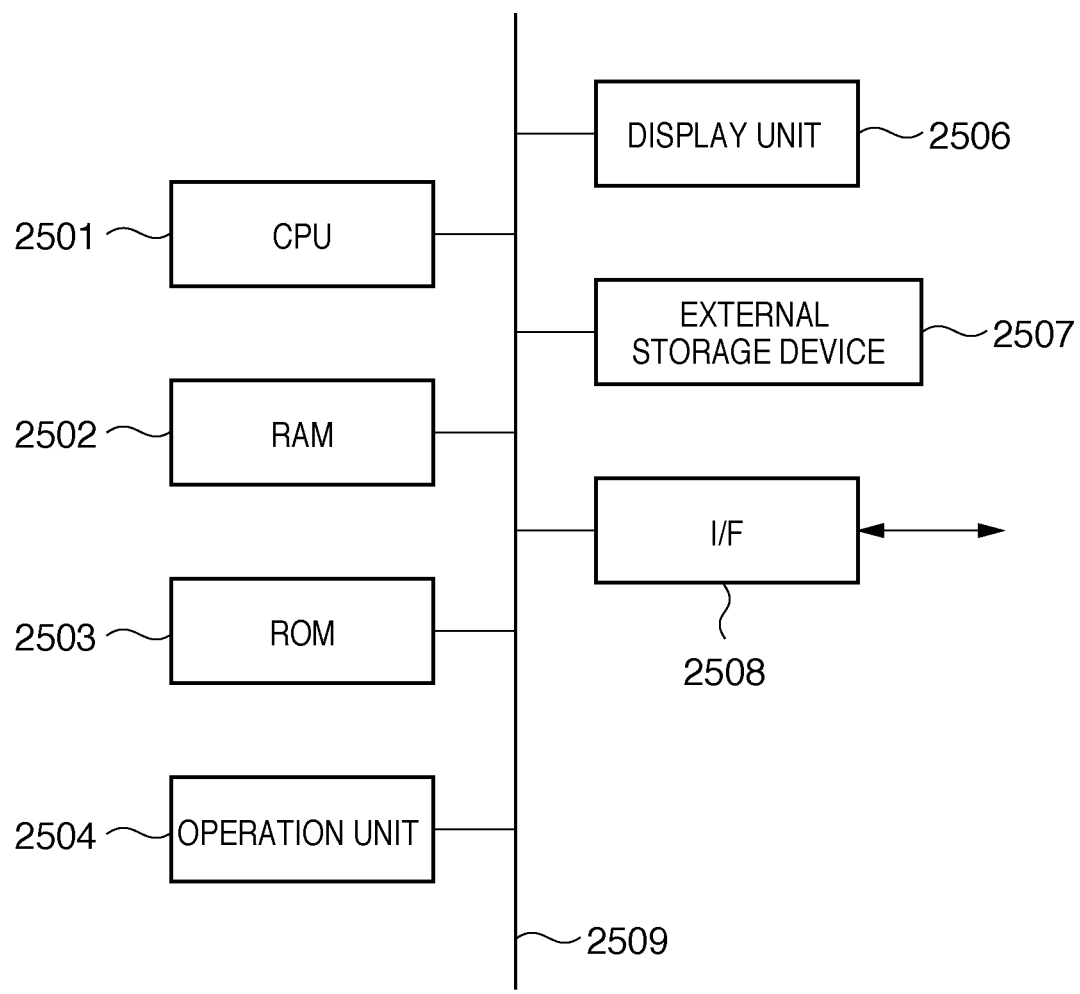
FIG. 6 is a block diagram exemplifying the hardware configuration of a computer.

As shown in FIG. 3A, the calculation unit 200 is a general PC (Personal Computer), and executes various calculation processes (to be described later). FIG. 6 is a block diagram exemplifying the hardware configuration of a computer applicable to the calculation unit 200.

A CPU 2501 controls the overall computer using computer programs and data stored in a RAM 2502 and ROM 2503. Also, the CPU 2501 executes processes which will be described to be performed by the calculation unit 200.

The RAM 2502 functions as an example of a computer-readable storage medium. The RAM 2502 has an area for temporarily storing computer programs and data loaded from an external storage device 2507, and image data acquired from the image sensing unit 100 via an I/F (interface) 2508. The RAM 2502 also has a work area used when the CPU 2501 executes various processes. That is, the RAM 2502 can appropriately provide a variety of areas. The ROM 2503 functions as an example of a computer-readable storage medium. The ROM 2503 stores computer setting data, a boot program, and the like.

An operation unit 2504 includes a keyboard and mouse. The user can manipulate the operation unit 2504 to input various instructions to the CPU 2501. A display unit 2506 is formed from a CRT, liquid crystal screen, or the like, and can display the result of processing by the CPU 2501 as an image, text, or the like.

The external storage device 2507 functions as an example of a computer-readable storage medium and is a large-capacity information storage device typified by a hard disk drive. The external storage device 2507 saves an OS (Operating System), and computer programs and data for causing the CPU 2501 to execute processes which will be described to be performed by the calculation unit 200.

These computer programs include computer programs (or functions) respectively corresponding to the image sensing condition control unit 210, feature amount cluster generation unit 220, feature space distance calculation unit 230, and image sensing condition setting unit 240 shown in FIG. 1. These data include image data to be processed, and data used as known information in the following description. In other words, the external storage device 2507 functions as even the image data holding unit 201, feature amount cluster holding unit 202, feature space distance holding unit 203, and image sensing condition holding unit 204 shown in FIG. 1.

Computer programs and data saved in the external storage device 2507 are properly loaded to the RAM 2502 under the control of the CPU 2501, and processed by the CPU 2501.

The I/F 2508 is used to connect the image sensing unit 100. The computer communicates data with the image sensing unit 100 via the I/F 2508. A bus 2509 connects the above-mentioned units.

Processing performed by the calculation unit 200 will be explained with reference to the flowchart of FIG. 2A. Note that the external storage device 2507 saves a computer program for causing the CPU 2501 to execute processing according to the flowchart of FIG. 2A. The CPU 2501 loads the computer program into the RAM 2502 and executes it.

For descriptive convenience, each unit shown in FIG. 1 serves as a main processor. However, as described above, the image sensing condition control unit 210, feature amount cluster generation unit 220, feature space distance calculation unit 230, and image sensing condition setting unit 240 are implemented as computer programs, and the CPU 2501 executes these computer programs. In practice, therefore, the CPU 2501 is a main processor for processing according to the flowchart of FIG. 2A.

In step S110, the image sensing condition control unit 210 sets different image sensing conditions in respective cameras which form the image sensing unit 100, and controls the respective cameras to sense a target object A. In the embodiment, the image sensing unit 100 is formed from N (N≧2) cameras, so there are image sensing conditions corresponding to the number of cameras, that is, N types of image sensing conditions. The image sensing condition control unit 210 acquires, from the image sensing unit 100, N sensed images obtained by image sensing, and stores them in the image data holding unit 201. N sensed images obtained by sensing the target object A will be called a "sensed image group A".

Figure 3B:
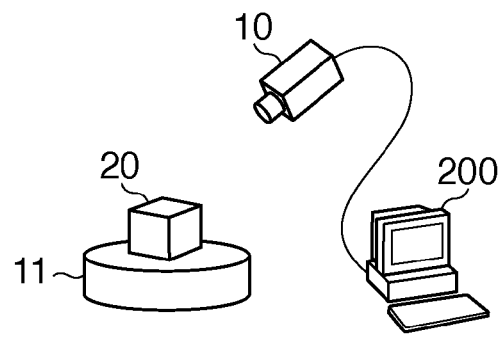

Note that the configuration is not limited to the foregoing one, and various configurations are conceivable as long as N images sensed under N respective types of image sensing conditions can be acquired. For example, one camera may sense the target object A while moving the camera, acquiring N sensed images under different image sensing conditions. Alternatively, as shown in FIG. 3B, the target object 20 may be set on a rotating stage 11. While rotating the rotating stage 11, the target object 20 is sensed using one camera 10, acquiring N sensed images under different image sensing conditions.

Then, the feature amount cluster generation unit 220 reads out the sensed image group A stored in the image data holding unit 201, and extracts feature amounts (feature amounts which describe feature points and their local supports) from the N respective sensed images which form the sensed image group A. For example, information such as the luminance gradient of an extracted local support such as SURF described in detail in the following reference 1 may be described:

(Reference 1) H. Bay, "Speeded-Up Robust Features (SURF)", Computing Vision and Image Understanding, Vol. 110 (3), June 2008, pp. 346-359.

Other feature points such as so-called Keypoints, which are described in detail in the following references 2 and 3, may be used:

(Reference 2) E. Tola, "A Fast Local Descriptor for Dense Matching", CVPR 2008.

(Reference 3) K. Mikolajczyk, "A Performance Evaluation of Local Descriptors", PAMI, 27(10) 2004, pp. 1615-1630.

In the first embodiment, feature amounts (vectors) obtained from respective feature points undergo vector quantization, like Bag-of-keypoints (Bag-of-words), creating a histogram for each sensed image. This histogram is used as a feature amount obtained from a sensed image. As a matter of course, various kinds of feature amounts are available, and the type of feature amount is not limited to one.

A set of feature amounts extracted from the respective sensed images of the sensed image group A can be obtained as a feature amount cluster. In the first embodiment, the above-described processes are executed for respective target objects (target object B, target object C, . . . ) As a result, feature amount clusters can be generated for the respective target object A, target object B, target object C, . . . . The feature amount cluster can be described as $$\Phi_m = \{F_{mi} | i=1,2,\ldots N\} \qquad (1)$$

where $F_{mi}$ is a feature amount (vector) extracted from a sensed image i (i=1, 2, . . . N) which forms the sensed image group m of the target object m (m=A, B, C, . . . ) For example, for SURF, a feature point is extracted from a sensed image, the region of the local support is cut out in accordance with the scale of the feature point, and the sum of the x and y gradients in the region is defined as a descriptor. The SURF undergoes vector quantization based on visual words (codebook) obtained in advance. A histogram is created for each sensed image and defined as F.

$\Phi_m$ is a set of feature amounts $F_{mi}$ extracted from the sensed image group m. Since the image sensing condition differs between sensed images, the index i also serves as the index of the image sensing condition.

The feature amount cluster generation unit 220 stores the generated feature amount cluster in the feature amount cluster holding unit 202. At this time, each feature amount in the feature amount cluster is associated with a corresponding image sensing condition. That is, the feature amount $F_{mi}$ is associated with the image sensing condition i of the sensed image i of the target object m.

Figure 3C:
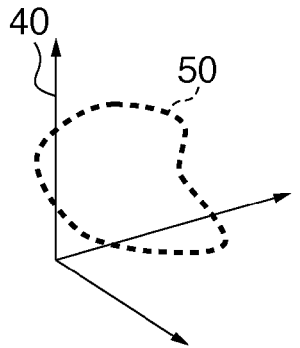
FIGS. 3C to 3H are views for explaining a feature space.
Figure 3D:
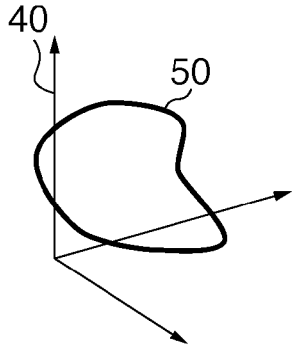

FIG. 3C is a view showing a feature space when the feature amount cluster is mapped in the feature space. Reference numeral 40 denotes the axis of the feature space; and 50, a feature amount cluster obtained for a given target object. Each point indicates a feature amount obtained from a sensed image under each image sensing condition. For example, when changing the relative position/orientation between the camera and the target object, the interval between feature amounts may be interpolated or approximated by a function, generating a manifold as represented by the feature amount cluster 50 in FIG. 3D.

As a result, N images sensed under N respective types of image sensing conditions are acquired. Feature amounts are extracted from the N respective acquired sensed images. The respective extracted feature amounts can be managed as a feature amount cluster in association with corresponding image sensing conditions. The feature amount cluster is generated for each target object and thus managed for each target object. It is also possible to perform the processing in step S110 in advance, and in the embodiment, start processes in step S120 and subsequent steps.

Referring back to FIG. 2A, in step S120, the feature space distance calculation unit 230 acquires one feature amount cluster (first feature amount cluster) from the feature amount cluster holding unit 202. The feature space distance calculation unit 230 specifies, from feature amount clusters held in the feature amount cluster holding unit 202, a feature amount cluster containing a feature amount most similar to each feature amount in the first feature amount cluster (first specification). More specifically, the feature space distance calculation unit 230 specifies, from the feature amount cluster holding unit 202, a feature amount cluster (second feature amount cluster) containing a feature amount having a minimum distance to the feature amount of interest in the first feature amount cluster in the feature space. The feature space distance calculation unit 230 executes this processing for each feature amount in the first feature amount cluster.

Figure 3E:
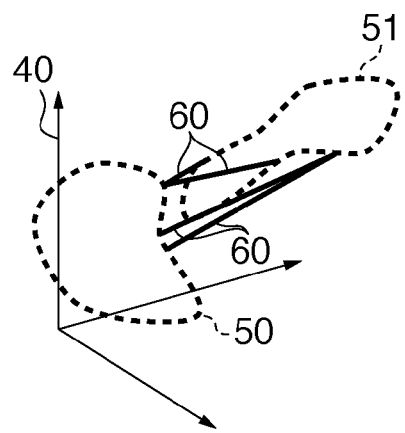

FIG. 3E is a view for explaining a distance 60 between feature amounts in the feature amount cluster 50 and a feature amount cluster 51. A distance d(x1,x2) between feature amounts x1 and x2 is calculated by $$d(x_1, x_2) = \sqrt{\sum_{j}^{n}(x_{1j} - x_{2j})^2} \quad (2)$$

where n is the total number of dimensions in the feature space, and j is the index indicating each dimension. The jth elements of the feature amounts x1 and x2 are given by x1*j* and x2*j*, respectively.

The feature space distance calculation unit 230 stores, in the feature space distance holding unit 203 in association with the feature amount x1, a pointer value indicating the second feature amount cluster containing a feature amount most similar to the feature amount x1 in the first feature amount cluster, and the distance between these feature amounts. This processing is done for each feature amount x1 in the first feature amount cluster.

Figure 3F:
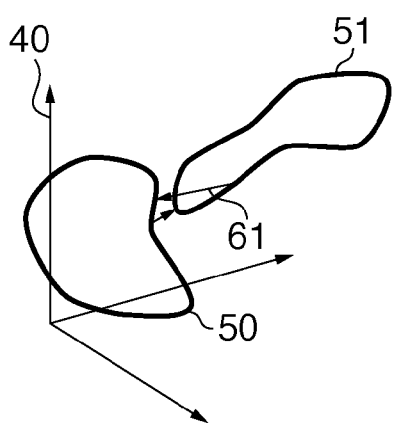

Instead of the distance between feature amounts, the correlation value between feature amounts may be calculated. In other words, any calculation processing may be performed as long as the second feature amount cluster containing a feature amount most similar to the feature amount of interest in the first feature amount cluster can be specified. FIG. 3F is a view exemplifying a distance 61 between feature amounts in the feature amount cluster 50 serving as the first feature amount cluster and the feature amount cluster 51 serving as the second feature amount cluster. Note that the distance between feature amounts is not limited to one calculated between feature amount clusters, and may be calculated within a feature amount cluster.

Referring back to FIG. 2A, in step S130, the image sensing condition setting unit 240 specifies a feature amount associated with a distance equal to or smaller than a threshold, by referring to distances associated with respective feature amounts in the first feature amount cluster in the feature space distance holding unit 203. The specified feature amount (specific feature amount) undergoes the following processing. Processing for one (specific feature amount of interest) of specific feature amounts will be explained. The same processing is also executed for the remaining specific feature amounts.

The image sensing condition setting unit 240 specifies, as the second feature amount cluster, a feature amount cluster indicated by a pointer value associated with the specific feature amount of interest. Then, the image sensing condition setting unit 240 extracts feature amounts corresponding to the same image sensing condition from the first and second feature amount clusters (second specification). More specifically, the image sensing condition setting unit 240 acquires a set i of a feature amount FAi associated with the image sensing condition i in the first feature amount cluster and a feature amount FBi associated with the image sensing condition i in the second feature amount cluster. The image sensing condition setting unit 240 performs this processing for i=1 to N. The image sensing condition setting unit 240 obtains the distance between feature amounts in the set i for i=1 to N, and specifies a set j having a maximum distance (third specification). j is given by $$F_{Ai}, F_{Bi} \in X \quad (3)$$
$$j = \underset{i}{\mathrm{argmax}}|d((F_{Ai} \mid i = 1, 2, \ldots, M), (F_{Bi} \mid i = 1, 2, \ldots, M))|$$

where X is a set of specific feature amounts of interest. The image sensing condition setting unit 240 stores (outputs), in (to) the image sensing condition holding unit 204 as an image sensing condition capable of discriminating the first and second feature amount clusters for the specific feature amount of interest, the image sensing condition j associated with the feature amount FBj in the set j. Needless to say, the difference between feature amounts in the set j may be stored (output) in (to) the image sensing condition holding unit 204 as an image sensing condition capable of discriminating the first and second feature amount clusters for the specific feature amount of interest.

Figure 3G:
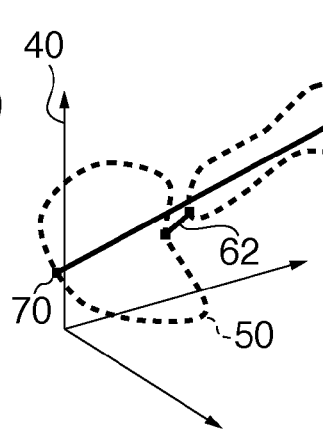

FIG. 3G is a view for explaining the processing in step S130 between the first and second feature amount clusters. The second feature amount cluster 51 is a feature amount cluster containing a feature amount having a minimum distance to the feature amount of interest in the first feature amount cluster 50. A distance 62 is the minimum distance. Reference numeral 70 denotes a distance between feature amounts in the set j.

Note that the above-described processing in step S130 is a general one regardless of the type of image sensing condition. Details of the processing in step S130 will be explained by exemplifying a case in which the relative orientation between the image sensing unit 100 and a target object is set as an image sensing condition.

Letting $\theta$ be the viewpoint (relative orientation), $F(\theta)$ be the feature amount obtained at the viewpoint $\theta$, and $\Delta\theta$ be the viewpoint change amount, the image sensing condition setting unit 240 determines the angle moving amount $\Delta\theta$ of the relative orientation at which $F1(\theta1)$ and $F2(\theta2)$ can be discriminated, by solving $$\theta_1, \theta_2 \in A' \quad (4)$$
$$\Delta\theta = \underset{\Delta\theta}{\mathrm{argmax}}|d(F_1(\theta_1 + \Delta\theta), F_2(\theta_2 + \Delta\theta))|$$

where $\theta1$ and $\theta2$ are viewpoints at which neighboring feature amounts in the feature space are obtained, and A' is a set of viewpoint combinations.

Figure 4:
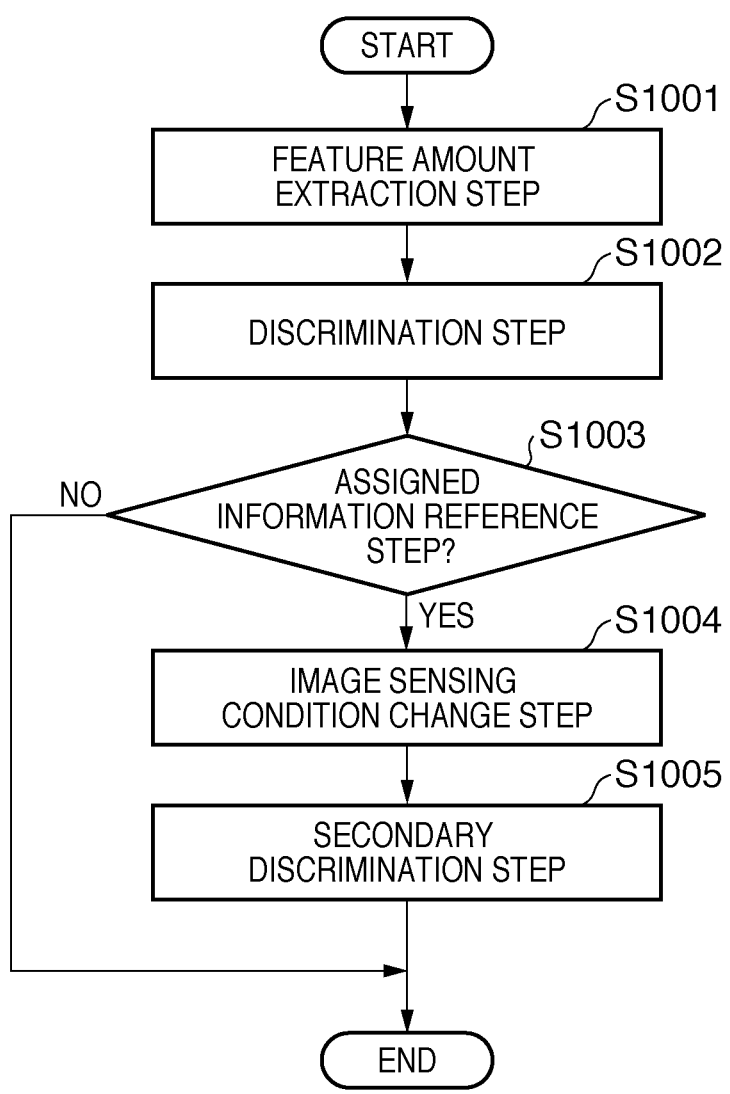
FIG. 4 is a flowchart of target object discrimination processing.

Next, target object discrimination processing using a feature amount cluster learned from a target object image by the above processing and using a set image sensing condition will be explained with reference to FIG. 4 which is a flowchart showing the target object discrimination processing. Note that the external storage device 2507 saves a computer program and data for causing the CPU 2501 to execute processing according to the flowchart of FIG. 4. The CPU 2501 loads the computer program and data into the RAM 2502 and executes the processing. As a matter of course, another apparatus may perform this processing.

In step S1001, a feature amount is extracted from an image which captures a target object. The extracted feature amount is the same as the feature amount handled in step S110. In step S1002, the feature amount extracted in step S1001 is discriminated based on the distance from the feature amount cluster generated in step S110 in the feature space. As the discrimination method, a feature amount having the smallest distance in the feature space is selected. The feature amount in the feature amount cluster is defined as a primary discrimination feature amount.

In step S1003, an image sensing condition assigned to the primary discrimination feature amount discriminated in step S1002 is referred to. If no image sensing condition is assigned to the primary discrimination feature amount, a feature amount neighboring the primary discrimination feature amount does not exist, so the discrimination processing ends. If an image sensing condition is assigned, a feature amount neighboring the primary discrimination feature amount exists. Thus, the process advances to step S1004 to change the image sensing condition and perform secondary discrimination. The feature amount neighboring the primary discrimination feature amount is defined as a neighboring feature amount.

In step S1004, the image sensing condition is changed in accordance with the image sensing condition referred to in step S1003. For example, when a viewpoint position is assigned to the discriminated primary discrimination feature amount, the position of the camera which senses a target object, or the target object is moved to capture an image and extract a feature amount.

In step S1005, the feature amount extracted in step S1004 is discriminated. As the discrimination method, secondary discrimination is performed based on the distance between feature amounts obtained by changing the image sensing condition of the primary discrimination feature amount discriminated in step S1002 and that of the neighboring feature amount.

Second Embodiment

Figure 3H:
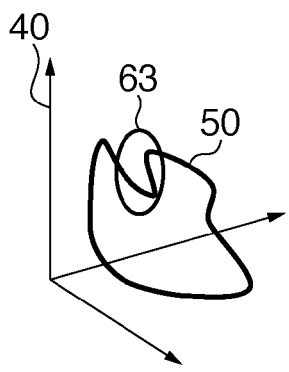

The second embodiment is different from the first embodiment only in the processes of steps S120 and S130, and the remaining processes are the same as those in the first embodiment. In step S120 of the second embodiment, the distance between the feature amount of interest in the first feature amount cluster and another feature amount in the first feature amount cluster is obtained. This processing is performed for respective feature amounts in the first feature amount cluster. This can assign an image sensing condition capable of discriminating feature amounts even if feature amounts extracted from a sensed image group obtained by sensing the same target object under different image sensing conditions neighbor each other in the feature space. In FIG. 3H, reference numeral 63 denotes a group of feature amounts which neighbor each other in one feature amount cluster 50. For example, when a feature amount cluster using, as a variable, the relative orientation between the camera and the target object is generated, an image sensing condition useful for discriminating the orientation of the target object can be assigned.

In step S130, a set of feature amounts i and j having a distance equal to or smaller than a threshold among distances obtained in step S120 is specified. Image sensing conditions corresponding to the respective feature amounts in the specified set are stored in an image sensing condition holding unit 204 in association with the feature amounts i and j.

When setting an image sensing condition, one capable of defining a change from the current image sensing condition is desirable. For example, such an image sensing condition can be obtained by defining a change of the relative position/orientation between the camera and the target object. A pair of feature amount vectors for which the distance between feature amounts obtained by giving the same change amount to the relative position/orientation between the camera and the target object is larger than a preset threshold among neighboring feature amounts is selected. In this case, an image sensing condition which gives a pair of feature amounts having a maximum distance between feature amount vectors is set. Letting $\theta$ be the viewpoint, $F(\theta)$ be the feature amount vector obtained at the viewpoint $\theta$, and $\Delta\theta'$ be the viewpoint change amount, $\Delta\theta'$ is determined by solving $$\theta_1, \theta_2 \in B \qquad (5)$$
$$\Delta\theta' = \underset{\Delta\theta}{\operatorname{argmax}} |d(F(\theta_1 + \Delta\theta), F(\theta_2 + \Delta\theta))|$$

where $\theta 1$ and $\theta 2$ are viewpoints at which neighboring feature amount vectors in the feature space are obtained, and B is a set of viewpoint combinations.

In some cases, a target object looks the same at a plurality of orientations or in a given section. When there are k feature amounts whose distances from a given feature amount are smaller than a preset threshold, $\Delta\theta'$ is determined by solving $$\Delta\theta' = \underset{\Delta\theta}{\operatorname{argmax}} |d(F(\theta_1 + \Delta\theta), F(\theta_2 + \Delta\theta), \ldots, F(\theta_k + \Delta\theta))| \qquad (6)$$

If the distribution of neighboring feature amounts is given as a one-dimensional distribution in a section of $\theta 1$ to $\theta k$, $\Delta\theta'$ may be determined by solving $$\Delta\theta' = \underset{\Delta\theta}{\operatorname{argmax}} |d(F(\theta_1 + \Delta\theta), F(\theta_k + \Delta\theta))| \qquad (7)$$

Third Embodiment

Figure 5:
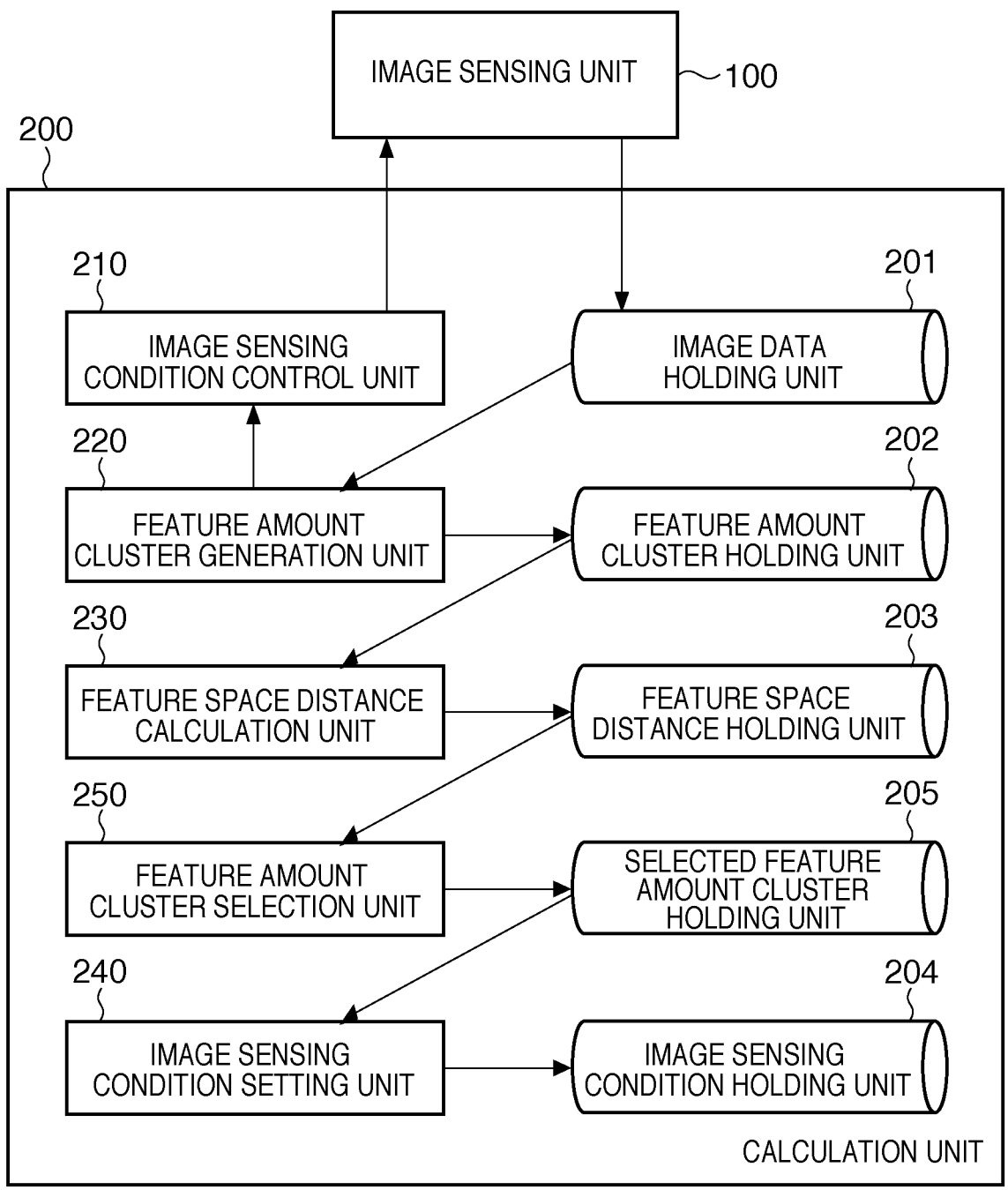
FIG. 5 is a block diagram exemplifying the functional arrangement of an image processing apparatus.

FIG. 5 is a block diagram exemplifying the functional arrangement of an image processing apparatus according to the third embodiment. The arrangement shown in FIG. 5 is obtained by adding a feature amount cluster selection unit 250 and selected feature amount cluster holding unit 205 to the calculation unit 200 shown in FIG. 1. FIG. 2B is a flowchart of processing performed by a calculation unit 200 according to the third embodiment. Note that the third embodiment is the same as the first embodiment except for the following points.

In step S220 of FIG. 2B, a feature space distance calculation unit 230 calculates the distance between feature amounts in feature amount clusters managed in a feature amount cluster holding unit 202. The feature space distance calculation unit 230 registers each feature amount cluster in a feature space distance holding unit 203 in association with a pointer value to another feature amount cluster with which the minimum distance between feature amounts has been calculated, and the minimum distance.

In step S230, the feature amount cluster selection unit 250 specifies (selects) the first feature amount cluster associated with a distance equal to or larger than the threshold in step S220, and the second feature amount cluster indicated by a pointer value associated with the first feature amount cluster. The feature amount cluster selection unit 250 stores the selected first and second feature amount clusters in the selected feature amount cluster holding unit 205. Before selection, feature amount clusters may be sorted based on an index other than the distance, such as whether the feature amount is stably obtained under various image sensing conditions or whether the feature amount changes upon a change of the image sensing condition.

In step S240, similar to the first embodiment, an image sensing condition setting unit 240 extracts feature amounts corresponding to the same image sensing condition from the first and second feature amount clusters. The image sensing condition setting unit 240 obtains the distance between the extracted feature amounts, and specifies a set of feature amounts, the obtained distance between which is maximum. The subsequent processing is the same as that in the first embodiment. The distance threshold used to set an image sensing condition is set in advance. A more useful feature amount is selected from the feature amount cluster selected by this processing. Discrimination processing is the same as that in the first embodiment. However, in step S1001, only a feature amount selected in step S230 is extracted.

Fourth Embodiment

In the fourth embodiment, an image sensing condition (feature amount) useful for discriminating feature amount clusters is set based on the distance in the feature space. Then, a feature amount cluster is selected by taking account of even the set image sensing condition. Discrimination processing is the same as that in the third embodiment.

Figure 8A:
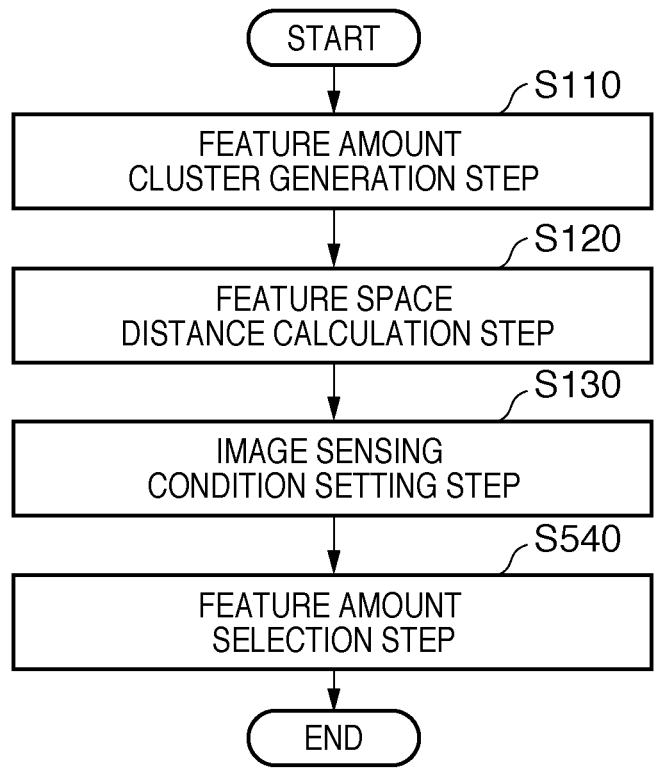
FIGS. 8A and 8B are flowcharts each of processing performed by the calculation unit 200.
Figure 8B:
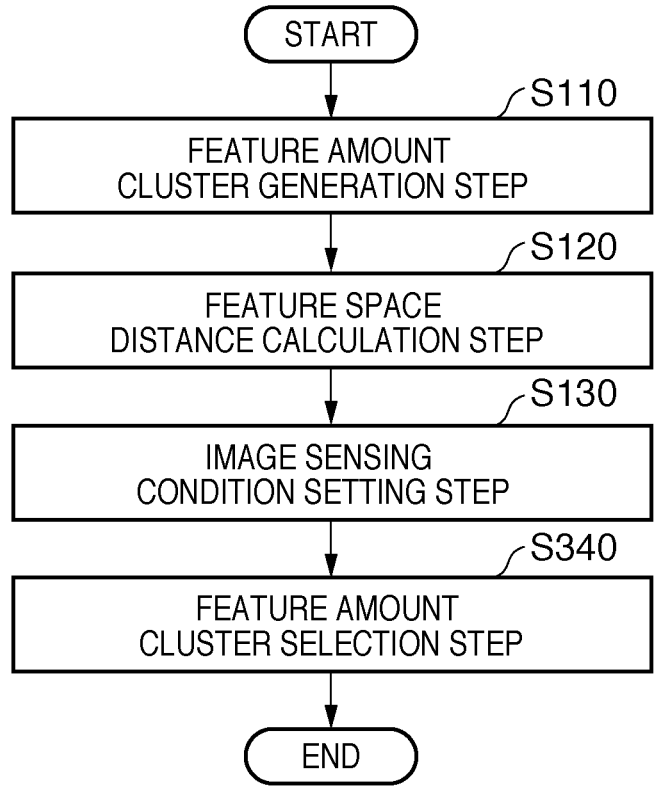
Figure 9:
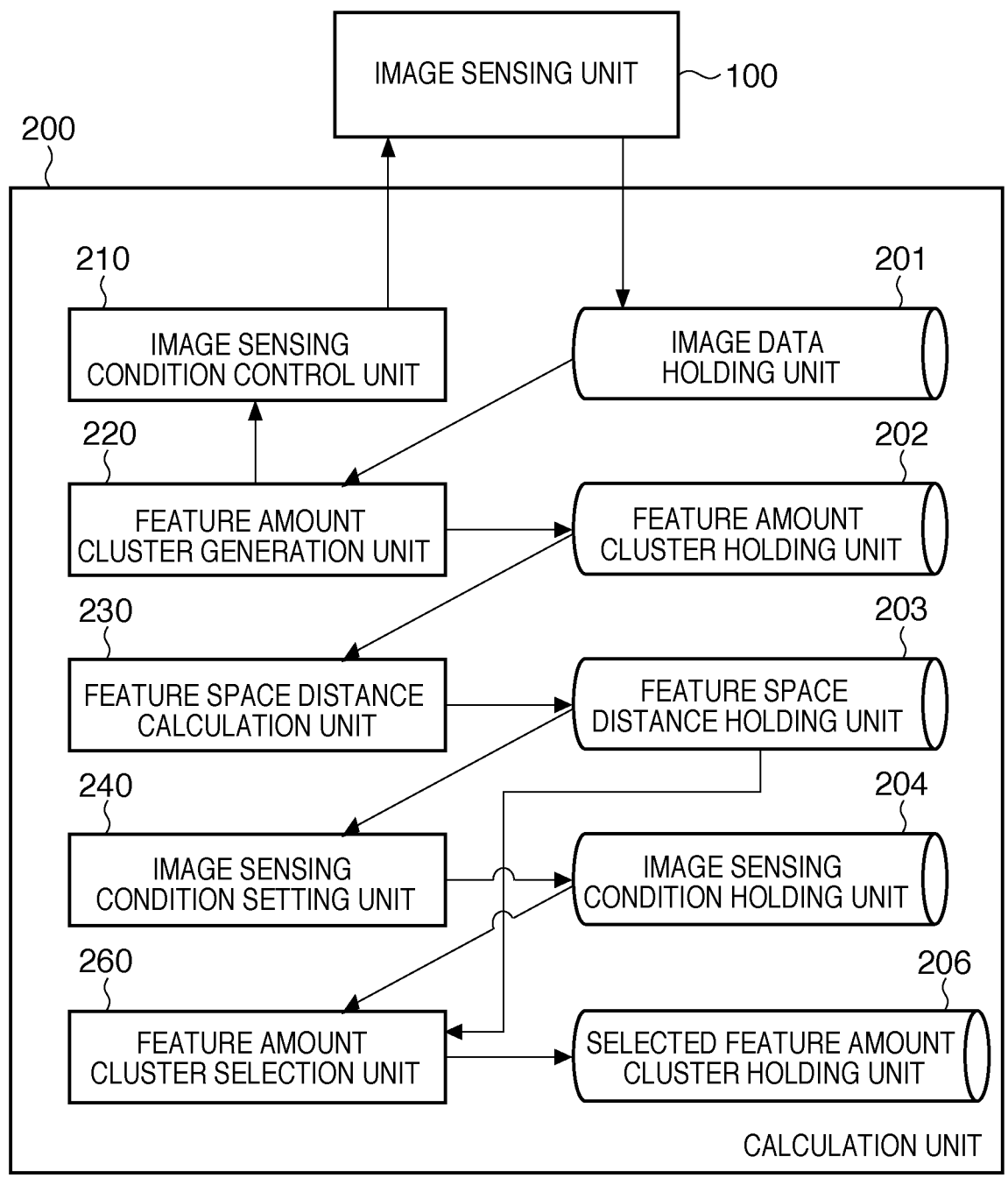
FIG. 9 is a block diagram exemplifying the functional arrangement of an image processing apparatus.

FIG. 9 is a block diagram exemplifying the functional arrangement of an image processing apparatus according to the fourth embodiment. The arrangement shown in FIG. 9 is obtained by adding a feature amount cluster selection unit 260 and selected feature amount cluster holding unit 206 to the calculation unit 200 shown in FIG. 1. FIG. 8B is a flowchart of processing performed by a calculation unit 200 according to the fourth embodiment. Note that the fourth embodiment is the same as the first embodiment except for the following points.

In step S340, a feature amount cluster useful for discrimination is selected based on a distance calculated in step S120 and an image sensing condition set in step S130. For example, distances and image sensing conditions assigned to feature amounts in a feature amount cluster, and the distances between feature amounts after changing the image sensing condition are weighted and added. Based on a score determined by the sum, a feature amount cluster (for example, having a large score) is selected.

Fifth Embodiment

Figure 10:
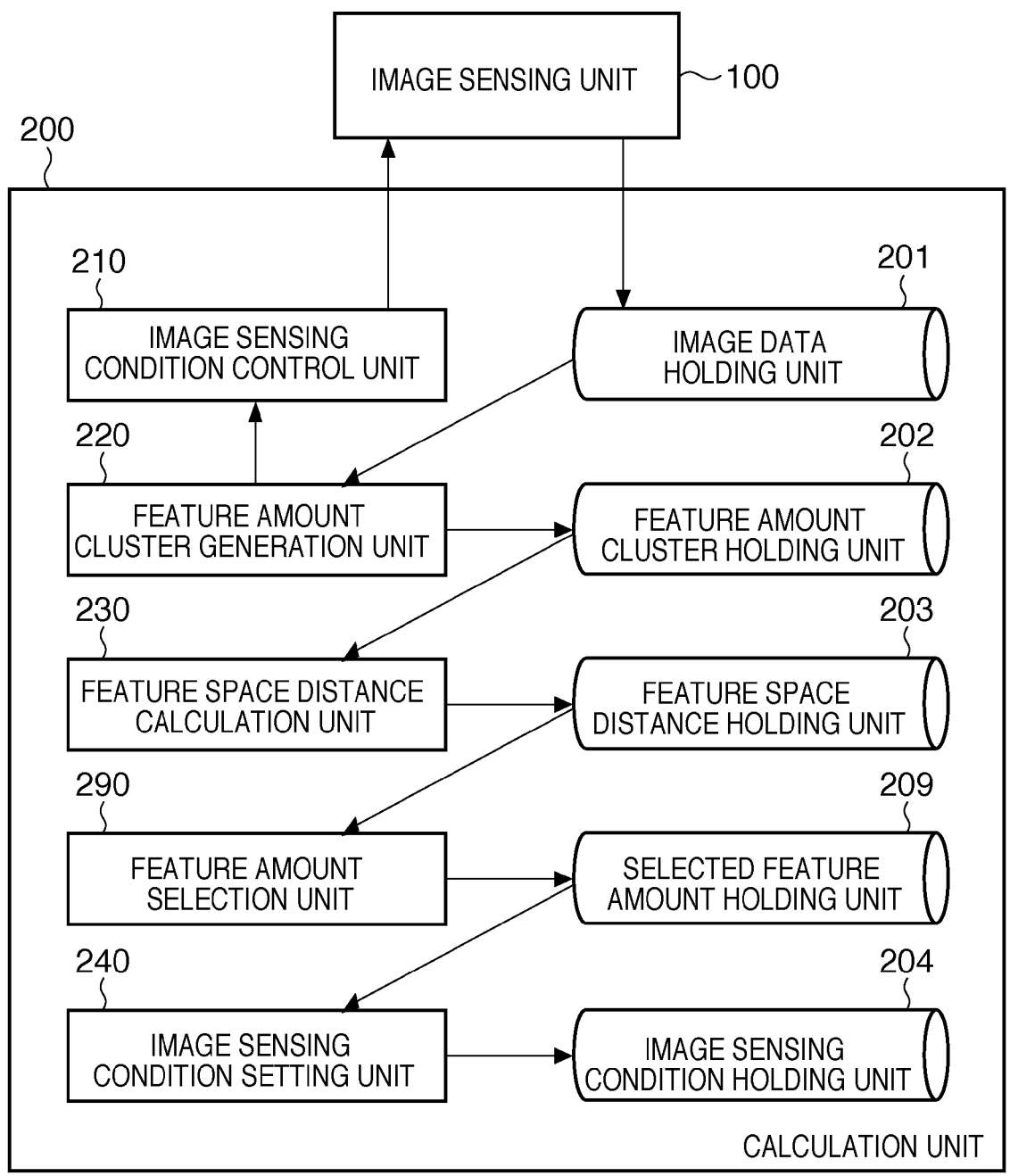
FIG. 10 is a block diagram exemplifying the functional arrangement of an image processing apparatus.
Figure 11A:
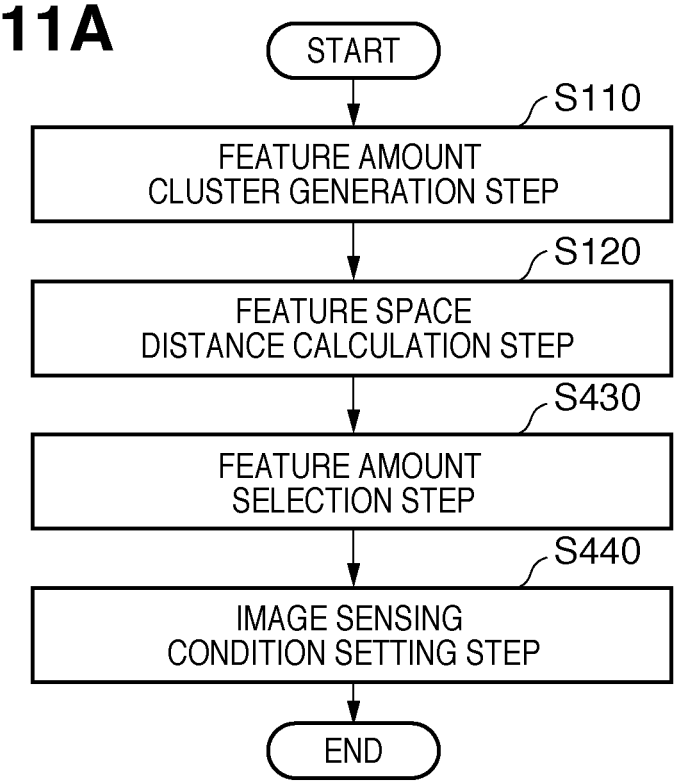
FIG. 11A is a flowchart of processing performed by the calculation unit 200.

In the fifth embodiment, the feature amount is selected for each image sensing condition based on the distance in the feature space. As for an image sensing condition for which no feature amount is selected, one capable of discriminating other target objects is assigned to the feature amount. FIG. 10 is a block diagram exemplifying the functional arrangement of an image processing apparatus according to the fifth embodiment. FIG. 11A is a flowchart of processing performed by a calculation unit 200 according to the fifth embodiment.

In step S430, a feature amount selection unit 290 selects, for each image sensing condition, a feature amount having a distance equal to or larger than a preset threshold, and registers the selected feature amount in a selected feature amount holding unit 209.

In step S440, if no feature amount is registered in the selected feature amount holding unit 209, an image sensing condition setting unit 240 performs the following processing. More specifically, an image sensing condition capable of discriminating feature amounts having the largest distance is set by selecting, from a feature amount cluster containing the feature amount, a feature amount having a distance equal to or larger than one which is set in advance to be able to discriminate target objects.

Figure 11B:
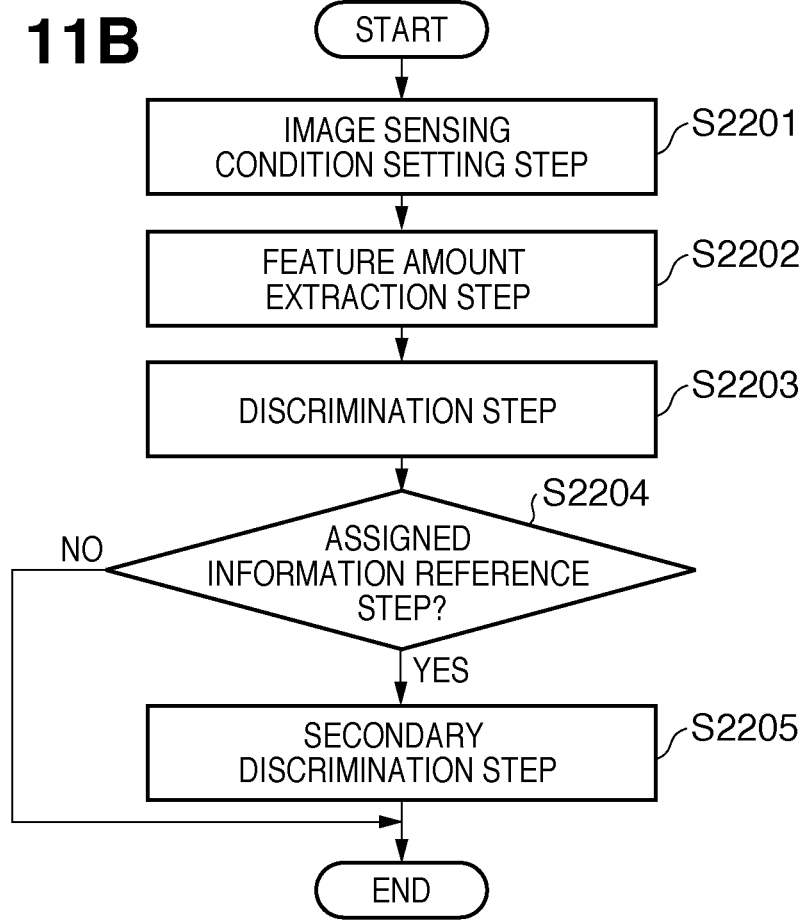
FIG. 11B is a flowchart of discrimination processing.

Discrimination processing will be explained with reference to FIG. 11B showing the flowchart of this processing. In step S2201, an image sensing condition useful for discriminating a target object is set, or a condition to sense a target object is input or estimated. In step S2202, a feature amount is extracted from an image sensed under the image sensing condition set (input or estimated) in step S2201. The extracted feature amount is the same as the feature amount in step S110.

In step S2203, the feature amount extracted in step S2202 is discriminated based on the distance from a feature amount cluster generated in step S110 in the feature space. As the discrimination method, a feature amount having the smallest distance in the feature space is selected. The feature amount in the feature amount cluster is defined as a primary discrimination feature amount.

In step S2204, an image sensing condition assigned to the primary discrimination feature amount discriminated in step S2203 is referred to. If no image sensing condition is assigned to the primary discrimination feature amount, a feature amount neighboring the primary discrimination feature amount does not exist, so the discrimination processing ends.

If an image sensing condition is assigned, a feature amount neighboring the primary discrimination feature amount exists. Thus, in step S2205, the image sensing condition is changed to perform secondary discrimination. The feature amount neighboring the primary discrimination feature amount is defined as a neighboring feature amount.

In step S2205, the image sensing condition is changed in accordance with the image sensing condition referred to in step S2204. If necessary, an image is captured, a feature amount is extracted, and the extracted feature amount is discriminated. As the discrimination method, secondary discrimination is performed based on the distance between feature amounts obtained by changing the image sensing condition of the primary discrimination feature amount discriminated in step S2203 and that of the neighboring feature amount.

Sixth Embodiment

In the sixth embodiment, an image sensing condition (feature amount) useful for discriminating feature amounts is set based on the distance in the feature space. Then, a feature amount useful for discrimination is selected for each image sensing condition in consideration of even the distance between features after changing the image sensing condition to the set one. Discrimination processing is the same as that in the fifth embodiment.

Figure 7:
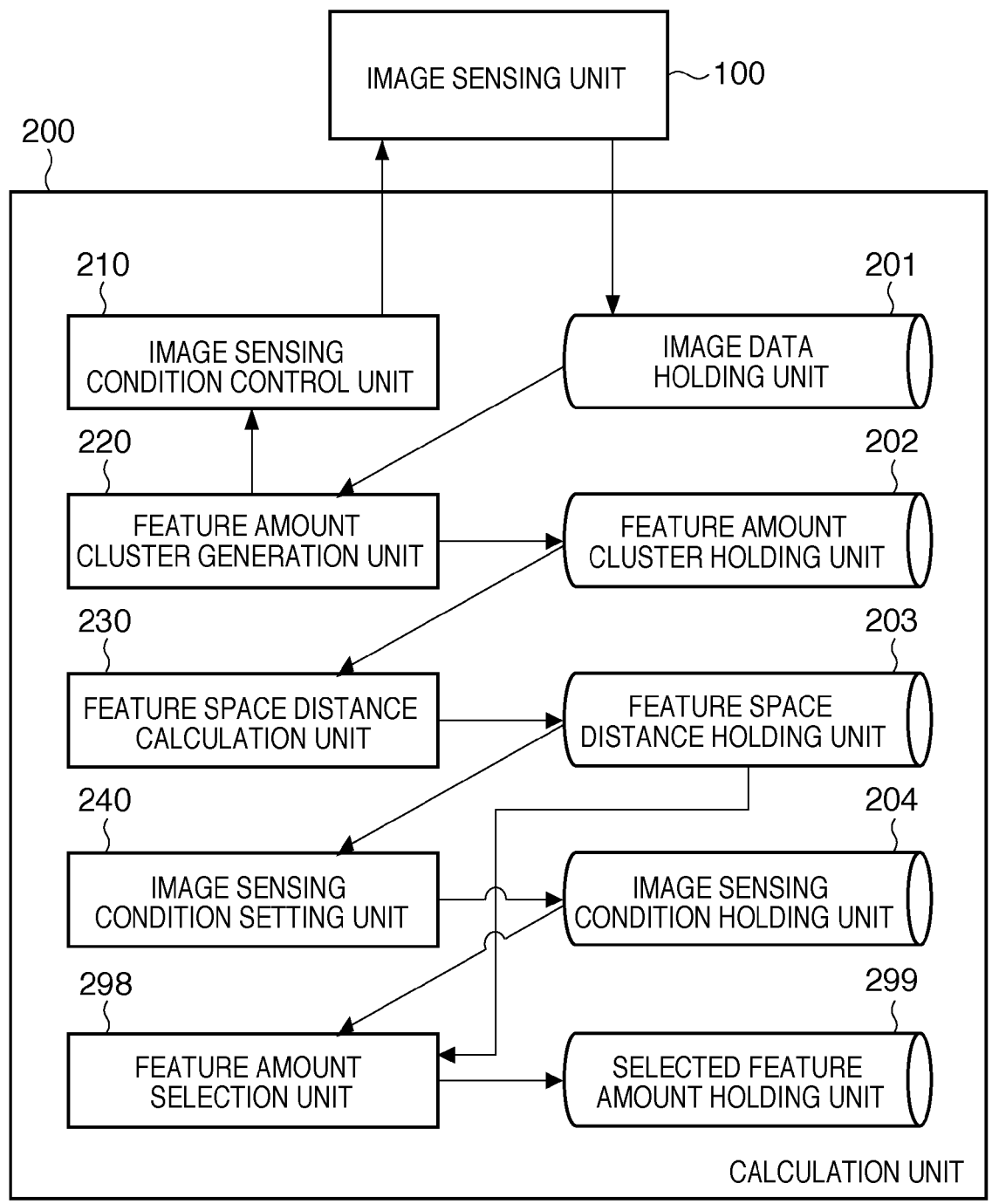
FIG. 7 is a block diagram exemplifying the functional arrangement of an image processing apparatus.

FIG. 7 is a block diagram exemplifying the functional arrangement of an image processing apparatus according to the sixth embodiment. FIG. 8A is a flowchart of processing performed by a calculation unit 200 according to the sixth embodiment. In step S540, a feature amount is selected for each image sensing condition based on a distance calculated in step S120, an image sensing condition set in step S130, and a changed distance. As the selection method at this time, for example, distances and image sensing conditions assigned to feature amounts in a feature amount cluster, and the distances between feature amounts after changing the image sensing condition are weighted and added. Based on a score determined by the sum, a feature amount is selected for each image sensing condition. Note that the above-described embodiments may be appropriately combined and used.

In the above-described image sensing condition setting method, an image sensing condition for discriminating similar target objects or falsely similar target objects is selected based on the distance in the feature space, thereby setting an image sensing condition capable of discrimination. In discrimination, when a target object similar to one to be measured exists, an image sensing condition for discriminating them can be output to change the image sensing condition, enabling secondary discrimination.

Also in the above-described feature selection method, a feature amount and image sensing condition for discriminating similar target objects or falsely similar target objects are selected based on the distance in the feature space, thereby selecting a feature amount capable of discrimination and setting an image sensing condition. In discrimination, when a target object similar to one to be measured exists, a feature amount for discriminating them or an image sensing condition for acquiring a feature amount can be output to change the feature amount or image sensing condition, implementing secondary discrimination. If an image sensing condition is known in advance, a feature amount corresponding to the image sensing condition is selected in advance. By extracting the feature amount, discrimination can be performed at high precision.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-251356 filed Oct. 30, 2009 which is hereby incorporated by reference herein in its entirety.

What is claimed is:

1. An image processing apparatus comprising:
a unit which acquires N images sensed under N respective types of image sensing conditions;
a management unit which extracts respective feature amounts from the N sensed images, and manages the extracted feature amounts as a feature amount cluster, in which each of the extracted feature amounts is in association with corresponding one of the image sensing conditions;
a first specification unit which specifies a second feature amount cluster containing a feature amount similar to a feature amount of interest in a first feature amount cluster among feature amount clusters managed by said management unit;
a second specification unit which specifies sets of feature amounts, each of the sets being associated with a corresponding one of the N respective types of image sensing conditions from the first feature amount cluster and the second feature amount cluster;
a third specification unit which specifies a set having a largest distance between feature amounts in the set among the sets specified by said second specification unit; and
a determination unit which determines an image sensing condition associated with the set specified by said third specification unit, as an image sensing condition for discriminating the first feature amount cluster and the second feature amount cluster.

2. The apparatus according to claim 1, wherein said first specification unit comprises
a unit which calculates a minimum distance between feature amounts in the first feature amount cluster and each of other feature amount clusters managed by said management unit, and
a unit which specifies, as the second feature amount cluster, a feature amount cluster having the minimum distance not smaller than a threshold, among the other feature amount clusters.

3. An image processing apparatus comprising:
a unit which acquires N images sensed under N respective types of image sensing conditions;
a management unit which extracts respective feature amounts from the N sensed images, and manages the extracted feature amounts as a feature amount cluster, in which each of the extracted feature amounts is in association with corresponding one of the image sensing conditions;
a specification unit which specifies, for a first feature amount cluster of feature amount clusters managed by said management unit, among the feature amount clusters, a second feature amount cluster containing a feature amount similar to a feature amount of interest in the first feature amount cluster; and
a determination unit which determines an image sensing condition for discriminating the first and second feature amount clusters, based on an image sensing condition associated with the feature amount of interest and an image sensing condition associated with the feature amount being similar to the feature amount of interest and being contained in the second feature amount cluster specified by said specification unit.

4. The apparatus according to claim 1, further comprising a unit which selects a feature amount cluster based on the distance and the image sensing condition.

5. The apparatus according to claim 1, further comprising a unit which selects a feature amount for each image sensing condition based on the distance and the image sensing condition.

6. An image processing method comprising:
a step of acquiring N images sensed under N respective types of image sensing conditions;
a management step of extracting respective feature amounts from the N sensed images, and managing the extracted feature amounts as a feature amount cluster, in which each of the extracted feature amounts is in association with corresponding one of the image sensing conditions;
a first specification step of specifying a second feature amount cluster containing a feature amount similar to a feature amount of interest in a first feature amount cluster among feature amount clusters managed in the management step;
a second specification step of specifying sets of feature amounts, each of the sets being associated with a corresponding one of the N respective types of image sensing conditions from the first feature amount cluster and the second feature amount cluster;
a third specification step of specifying a set having a largest distance between feature amounts in the set among the sets specified in the second specification step; and
a determination step of determining an image sensing condition associated with the set specified in the third specification step, as an image sensing condition for discriminating the first feature amount cluster and the second feature amount cluster,
wherein at least one of said steps is performed with a processor.

7. An image processing method comprising:
a step of acquiring N images sensed under N respective types of image sensing conditions;
a management step of extracting respective feature amounts from the N sensed images, and managing the extracted feature amounts as a feature amount cluster, in which each of the extracted feature amounts is in association with corresponding one of the image sensing conditions;
a specification step of specifying, for a first feature amount cluster of feature amount clusters managed by said management step, among the feature amount clusters, a second feature amount cluster containing a feature amount similar to a feature amount of interest in the feature amount cluster; and
a determination step of determining an image sensing condition for discriminating the first and second feature amount clusters, based on an image sensing condition associated with the feature amount of interest and an image sensing condition associated with the feature amount being similar to the feature amount of interest and being contained in the second feature amount cluster specified in the specification step,
wherein at least one of said steps is performed with a processor.

8. A non-transitory computer-readable storage medium storing a computer program for causing a computer to function as each unit of an image processing apparatus defined in claim 1.

9. A non-transitory computer-readable storage medium storing a computer program for causing a computer to function as each unit of an image processing apparatus defined in claim 3.

* * * * *